United States Patent
Borquez et al.

(10) Patent No.: US 7,069,222 B1
(45) Date of Patent: Jun. 27, 2006

(54) METHOD AND SYSTEM FOR CONSECUTIVE TRANSLATION FROM A SOURCE LANGUAGE TO A TARGET LANGUAGE VIA A SIMULTANEOUS MODE

(76) Inventors: Brigido A Borquez, 2545 E. Fairfield, Mesa, AZ (US) 85213; Elizabeth A. Borquez, 2545 E. Fairfield, Mesa, AZ (US) 85213

( * ) Notice: Subject to any disclaimer, the term of this patent is extended or adjusted under 35 U.S.C. 154(b) by 315 days.

(21) Appl. No.: 09/599,817

(22) Filed: Jun. 23, 2000

(51) Int. Cl.
*G10L 21/02* (2006.01)

(52) U.S. Cl. .............................. 704/277; 704/3; 704/9; 360/73.09; 348/14.07

(58) Field of Classification Search .................... 704/3, 704/277, 9; 360/73.09; 348/14.07
See application file for complete search history.

(56) References Cited

U.S. PATENT DOCUMENTS

| | | | | |
|---|---|---|---|---|
| 4,446,494 A * | 5/1984 | Stockham et al. | ....... | 360/73.09 |
| 4,965,819 A * | 10/1990 | Kannes | .............. | 348/14.07 |
| 5,384,701 A * | 1/1995 | Stentiford et al. | .............. | 704/3 |
| 5,426,706 A * | 6/1995 | Wood | .......................... | 381/85 |
| 5,724,526 A * | 3/1998 | Kunita | ....................... | 704/277 |
| 5,884,256 A * | 3/1999 | Bennett et al. | ............. | 704/235 |
| 6,219,646 B1 * | 4/2001 | Cherry | ........................ | 704/277 |
| 6,434,518 B1 * | 8/2002 | Glenn | ............................. | 704/3 |
| 2001/0035829 A1 * | 11/2001 | Yu et al. | | |

* cited by examiner

*Primary Examiner*—Richemond Dorvil
*Assistant Examiner*—Qi Han
(74) *Attorney, Agent, or Firm*—Schmeiser, Olsen & Watts LLP

(57) ABSTRACT

A consecutive, simultaneous translation method and system for use in courtroom and other settings to permit accurate and discrete translation from a source language to a target language. In its most basic form, the method involves providing a translator with a record/playback device, so that the translator can record words spoken in a source language, allow time for, for example, an objection and ruling, and play back the recorded words in the source language and translate those into the target language in a simultaneous manner. Other features include earphones for the translator to afford greater discretion and accuracy, slow playback capabilities, and other enhancements.

11 Claims, 3 Drawing Sheets

METHOD AND SYSTEM FOR CONSECUTIVE TRANSLATION FROM A SOURCE LANGUAGE TO A TARGET LANGUAGE VIA A SIMULTANEOUS MODE

BACKGROUND OF THE INVENTION

1. Field of the Invention

This invention relates to the field of translation and more particularly, to a method and system for consecutive yet simultaneous translation of words spoken in a source language to a target language.

2. Description of the Related Art

Oral translation of conversation, statements, questions, etc. involves the translation of words spoken in a source language to words spoken in a target language. Generally, oral translation can take two forms. The most accurate method involves the simultaneous translation from the source language to the target language, which involves the translator translating the speaker's words as they are spoken and beginning before the speaker has finished talking. This method is most accurate for the obvious reason that the burden on the translator to memorize what the speaker has said is greatly alleviated by translating before the speaker has even finished talking.

A second method is a consecutive translation, in which the translator waits for the speaker to completely finish before commencing translation. However, an obvious problem with this method is that, particularly where the speaker has made a long statement, the translator may have difficult remembering precisely what the speaker has stated, and may omit certain words or otherwise mis-translate.

The distinctions between the two methods come into stark focus in, for example, a courtroom setting. In such a setting, accuracy in translation is particularly important. This would tend to argue in favor of using a simultaneous translation method. However, some courtrooms prohibit simultaneous translation for at least those portions of the proceedings in which a witness is being examined by counsel, instead requiring that before the translator can translate the examining attorneys' words, the translator must first wait sufficient time for opposing counsel to make an objection and, if an objection has been made, for the court to rule on the objection. While this method avoids the need to translate a question that may been ruled improper and thus one that the witness may not be compelled to answer, there is a danger that a relatively significant amount of time can pass between the asking of the question and the actual translation, leading potentially to an inaccurate translation.

A need therefore existed for permitting simultaneous translation, on the one hand, while at the same time providing the pause necessary to allow for an objection/ruling on the other. The present invention satisfies this need and provides other related advantages.

SUMMARY OF THE INVENTION

An object of the present invention is to provide a method and system for consecutive, simultaneous translation from a source language to a target language.

A further object of the present invention is to provide a translation method and system permitting consecutive, simultaneous translation from a source language to a target language in a discrete, non-disruptive manner.

A still further object of the present invention is to provide a translation method and system permitting consecutive, simultaneous translation from a source language to a target language where the translation needs to be broadcast over a telephone line.

The present invention, in one embodiment, consists of equipping the translator with a recording/playback device and a set of headphones. When the questioner speaks in the source language, the translator records the question. After waiting for the objection/ruling, the translator plays back the question, through the headphones, and simultaneously translates the question into the target language. The recording device is preferably digital, so that there will be no need to rewind. The method and system preferably further include one or more remote microphones for participants to speak into, which microphones would be linked to the recording/playback device. The method could further include headphones for one or more of the speakers, to enable them to more clearly hear the translator when he or she speaks.

The method and system provide the combined benefits of the accuracy of simultaneous translation and the delay for objections of consecutive translation—together with an additional benefit. Because the translator will hear the statement to be translated twice—once when spoken live and the second time when played back on the recording device—the translator can begin to work on the translation after hearing the statement spoken the first time and while waiting for the play back, resulting in a more accurate translation.

BRIEF DESCRIPTION OF THE PREFERRED EMBODIMENTS

In accordance with the present invention, a method for simultaneously translating from a source language to a target language is disclosed. The method comprises the steps of: providing a recording device capable of recording words spoken in a source language; wherein the recording device further comprises means for playing back the words spoken in the source language; speaking the words in the source language; recording the words in the source language in the recording device; playing back the words in the source language; and simultaneously translating the words in the source language into a target language.

In accordance with another embodiment of the present invention, a translation system is disclosed. The system comprises, in combination: a digital recording and playback device; earphones coupled to the recording and playback device; and at least one microphone remote from the recording and playback device wherein the microphone is in one of wire and wire-free communication with the recording and playback device.

The foregoing and other objects, features, and advantages of the invention will be apparent from the following, more particular, description of the preferred embodiments of the invention, as illustrated in the accompanying drawings.

DETAILED DESCRIPTION OF THE PREFERRED EMBODIMENTS

Figure 1:
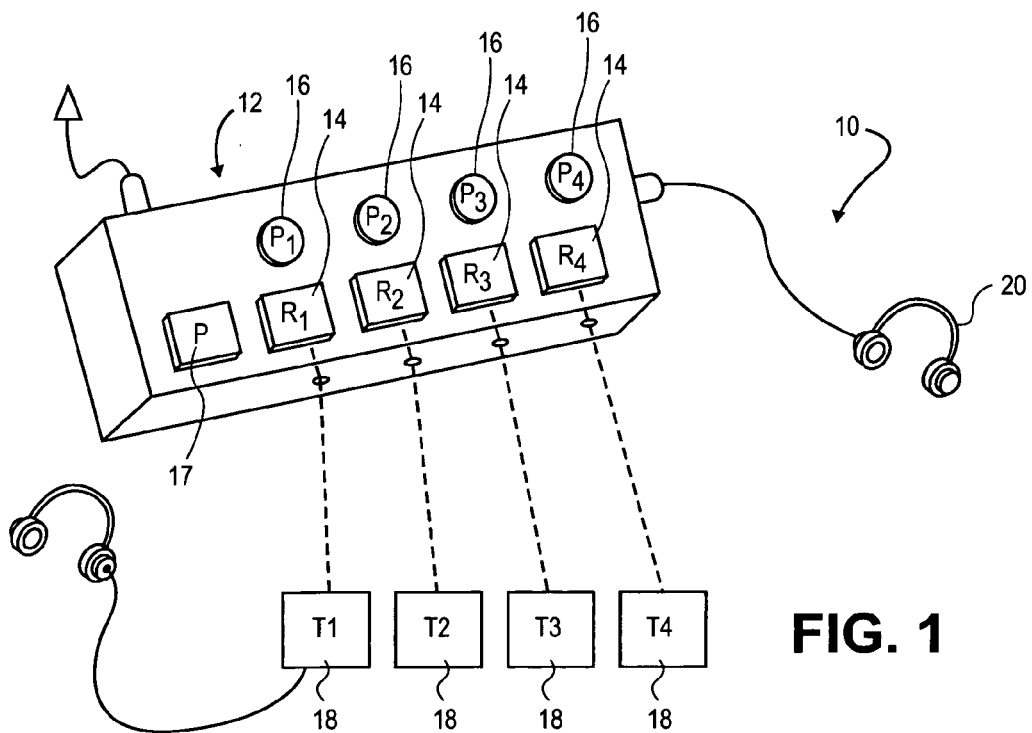
FIG. 1 is a perspective view of one embodiment of the system employed in the translation method of the present invention.

Referring first to FIG. 1, an embodiment of the translation system 10 (hereinafter "system 10") of the present invention is shown. The system 10, in this embodiment, includes a recording device 12. Preferably, the recording device 12 is digital, to permit substantially instant replaying of recorded material without the need for rewinding. The recording device 12 preferably has a plurality of individual recording activators (R1–R4) 14, and a plurality of playback activators (P1–P4) 16, corresponding to the individual recording activators 14 as indicated by the number suffixes shown in FIG. 1. The system 10 further includes, preferably, a plurality of microphones (T1–T4) 18, corresponding to the recording activators 14 and the playback activators 16 as indicated by the number suffixes. The microphones 18 are preferably in wireless communication with the recording device 12, although wire communication is also possible. Still referring to FIG. 1, the system 10 further preferably includes earphones 20 coupled to the recording device 12.

Figure 2:
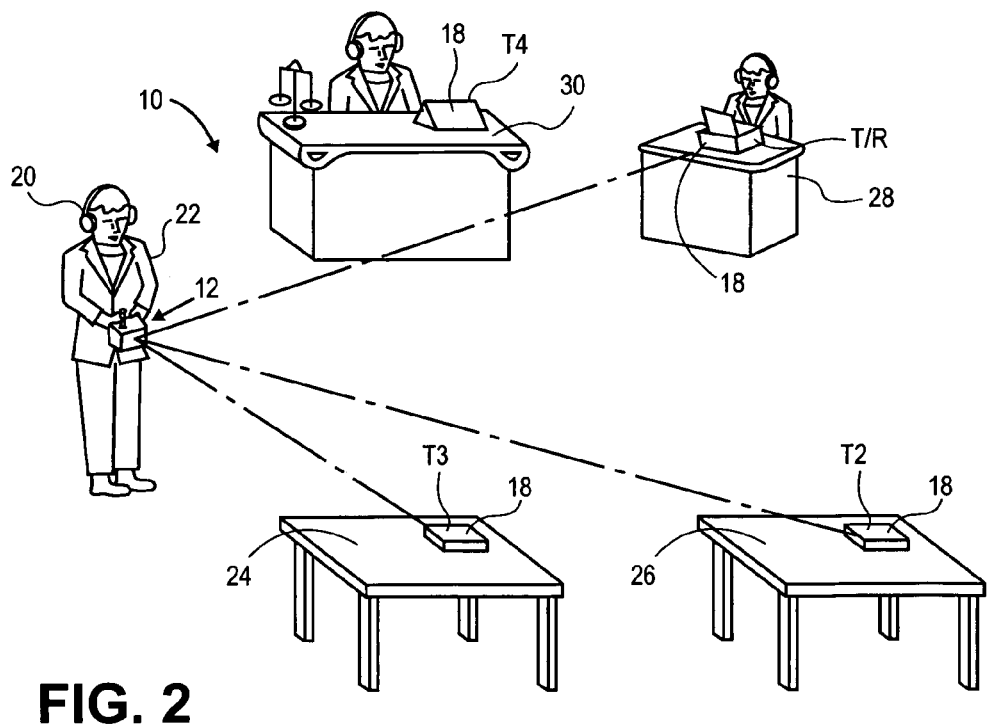
FIG. 2 is a perspective view of the system employed in the translation method of the present invention.

Referring now to FIG. 2, the placement of the system 10 of FIG. 1 for use in a courtroom setting is shown. The recording device 12 is in the possession of a translator 22, who will be responsible for activating the recording device 12 as appropriate. The microphones 18 are positioned throughout the courtroom, with one at a prosecutor's table 24, one at a defendant's table 26, one at a witness stand 28, and one at a judge's bench 30. Of course, while the use of the system 10 is shown in a courtroom setting, this is exemplary only. The system 10 may be used in any setting requiring translation, including for example business meetings, diplomatic meetings or gatherings, and educational gatherings.

Figure 3:
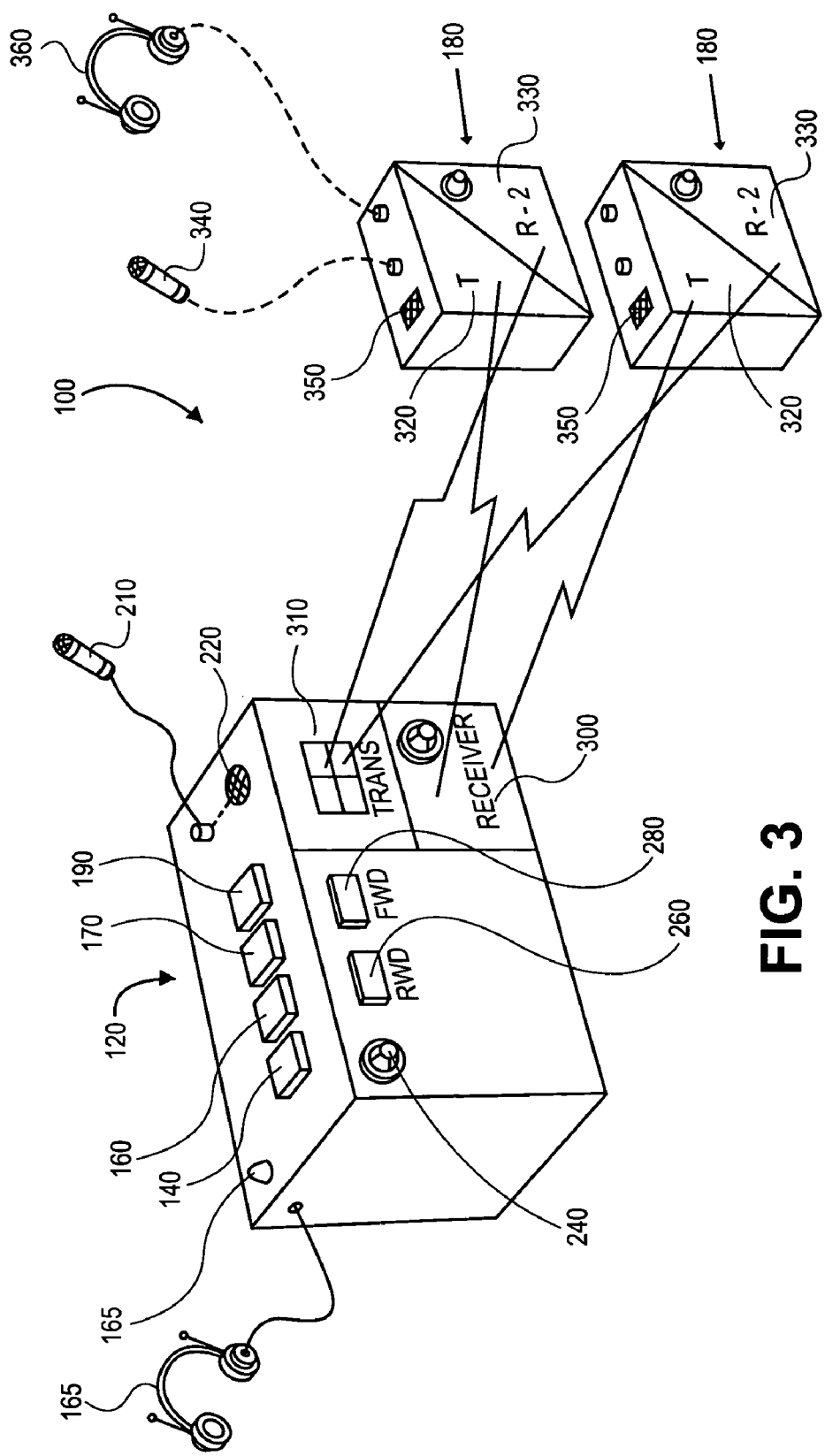
FIG. 3 is a perspective view of another embodiment of the system employed in the translation method of the present invention.

Referring now to FIG. 3, another embodiment of the system 10 is shown, referred to herein as the system 100. The system 100 includes a recording device 120 and remote microphones/receivers 180. Referring now to the recording device 120, it preferably includes the following features: a recording activator 140, a recording light indicator 150, a playback activator 160, earphones 165, a pause activator 170 to pause either the playing back of a recorded statement or the recording of a statement (for example where the statement to be recorded is interrupted), a slow playback activator 190 to slow the speed at which a recorded statement is played back, a hand microphone 210, a built-in microphone 220, a volume control 240, a rewind activator 260 for rewinding a recorded statement, a forward activator 280 for fast-forwarding through a recorded statement, a receiver 300 for receiving wireless transmissions from the remote microphones/receivers 180, and a transmitter 310 for making wireless transmissions to the microphones/receivers 180. Each microphone/receiver 180 comprises a transmitter 320 for making wireless transmissions to the receiver 300, a receiver 330 for receiving wireless transmission from the transmitter 310, a hand microphone 340, and a built-in microphone 350. Preferably, one or more of the microphones/receivers 180 further includes earphones 360 so that a person using the microphone/receiver 180 may hear more effectively transmissions originating from the transmitter 310.

Figure 4:
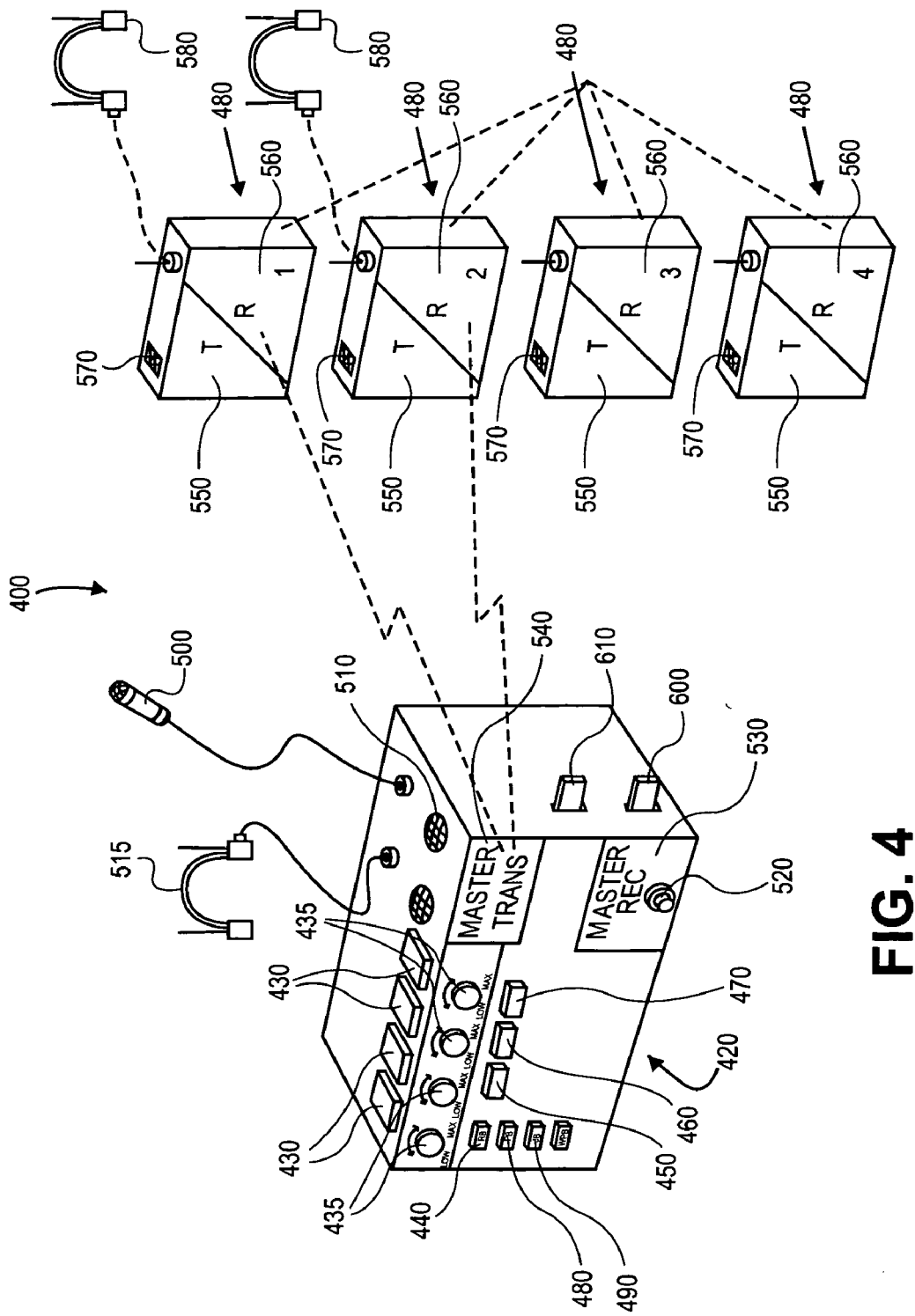
FIG. 4 is a perspective view of yet another embodiment of the system employed in the translation method of the present invention.

Referring now to FIG. 4, another embodiment of the system 10 is shown, referred to herein as the system 400. The system 400 includes a recording device 420 and remote microphones/receivers 480. Referring now to the recording device 420, it preferably includes the following features: a plurality of recording/playback activators 430, a plurality of individual volume controls 435 corresponding to each of the recording/playback activators 430, a lighted master record activator 440, a master playback activator 450, a fast forward activator 460 for fast-forwarding through a recorded statement, a rewind activator 470 for rewinding a recorded statement, a pause activator 480 to pause the either the playing back of a recorded statement or the recording of a statement, a slow playback activator 490 to slow the speed at which a recorded statement is played back, a hand microphone 500, a built-in microphone 510, a master volume control 520, a receiver 530 for receiving wireless transmissions from the remote microphones/receivers 480, a transmitter 540 for making wireless transmissions to the microphones/receivers 480, and earphones 515. The recording device 420 preferably further comprises a telephone input 600 for receiving a first telephone cord (not shown) from a wall telephone jack and a telephone output 610 for receiving a second telephone cord (not shown) to a telephone base (not shown). Each microphone/receiver 480 comprises a transmitter 550 for making wireless transmissions to the receiver 530, a receiver 560 for receiving wireless transmission from the transmitter 540, and a built-in microphone 570. Preferably, one or more of the microphones/receivers 480 further includes earphones 580 so that a person using the microphone/receiver 480 may hear more effectively transmissions originating from the transmitter 540.

STATEMENT OF OPERATION

The basic operation of the systems 10, 100 and 400 is substantially similar, and the basic operation will therefore be described of all three systems—introducing differences as appropriate. In use, a translator 22 will control the recording device 12, 120, or 420. A first person, for example a prosecuting attorney, will speak in the source language into a microphone 18 (or a hand microphone 340, or a built-in microphone 350 or 570). The first person's words will be transmitted, if using the system 10, through wires or in a wireless manner—depending on how configured—from the microphone 18 to the recording device 12. If using the system 100, the first person's words will be transmitted from the transmitter 320 of the microphone/receiver 180 to the receiver 300 of the recording device 120. If using the system 400, the first person's words will be transmitted from the transmitter 550 of the microphone/receiver 480 to the receiver 530 of the recording device 420.

The translator 22 will record the first person's words in the recording device 12, 120, or 420. A translator 22 using the recording device 12 can record by depressing the appropriate individual recording activator 14 corresponding to the particular microphone 18 used by the speaker—one time to initiate recording and a second time to terminate recording. A translator 22 using the recording device 120 can record by depressing the recording activator 140—one time to initiate recording and a second time to terminate recording. A translator 22 using the recording device 420 can record by depressing the recording/playback activator 430 corresponding to the particular microphone/receiver 480 used by the speaker—one time to initiate recording and a second time to terminate recording. (Instead of toggling the recording on and off in this manner, a stop activator can be provided to terminate recording.)

When the translator 22 is prepared to translate for the first speaker's words—for example, after waiting for any objection to the first speaker's statement and any ruling on such an objection—the translator 22 will play back the first person's recorded words and simultaneously translate them into the target language. To play back, a translator 22 using the system 10 will depress the appropriate individual playback activator 16, corresponding to the particular individual recording activator 14 used—or will depress the master playback activator 17. A translator 22 using the system 100 will depress the playback activator 160. A translator 22 using the system 400 will re-depress the appropriate recording/playback activator 430. If the first person speaks in a particularly fast or unclear manner, or simply in the interest of ensuring accuracy, the translator 22 may wish to play his or her words back in a slower manner, by using the slow playback activator 190 or 490. If necessary, for example in the event of an interruption, the translator 22 may pause the playback (or recording) by depressing the pause activator 170 or 480 to pause the playing back (or recording) of a recorded statement. During playback, the translator 22 may as necessary rewind the recorded words by using the rewind activator 260 or 470, or fast-forward the recorded words by using the forward activator 280 or 460.

When the first person's words are played back by the translator 22, the translator 22 can listen to those words in a manner that is non-disruptive to others (and indeed in a manner that is not apparent to others) present in the translation setting by using earphones 20, 165, or 515, depending on the particular system used. As the translator 22 listens to the first person's recorded words, he will simultaneously translate those words into the target language. In the embodiments of systems 100 and 400, the translator 22's spoken translation may be transmitted (using the transmitter 310 or 540 depending on the particular system) to the microphone/receiver 180 or 480, where that translation may itself be listened to in a discrete and effective manner using earphones 360 or 580.

It is sometimes necessary to conduct a translation telephonically, with, for example, a person speaking in the source language over the telephone to the translator 22 and with the translator 22 then translating those words into the target language and transmitting the translation over the telephone. In such instances, a telephone cord from a wall telephone jack will be inserted into a telephone input 600, and a telephone cord coupled to a telephone base will be inserted into a telephone output 610. When the person whose words are to be translated speaks over the telephone line, the transmission passes through the recording device 420 and is recorded, played back, and translated in the manner described above with respect to an in-person translation.

While the invention has been described with reference to particularly preferred embodiments, it will be apparent that various modifications can be made without departing from the spirit of the invention. For example, while each of the systems 10, 100 and 400 incorporate a plurality of preferred features intended to promote efficient use of the disclosed translation method, an extremely basic system including nothing more than a recording/playback device controlled by the translator and capable of recording words spoken in the source language for playing back by the translator for simultaneous translation—including even a tape-type recorder—would be within the spirit and scope of the present invention. While a digital recorder would be preferred over a tape-type recorder for, among other things, its ability to instantly play back without the need to first rewind, and while headphones for the translator are preferred for their ability to make the entire process essentially undetectable to an observer, these and the other enhanced features additional to the basic system are not regarded as essential to the operation of the basic translation method and system claimed herein.

What is claimed is:

1. A method for delivering a consecutive translation from a source language to a target language via a simultaneous mode in a courtroom, the method comprising the steps of:
   a human translator hearing words spoken in a source language;
   said human translator utilizing one or more remote transmitter and a digital recording device having a wireless receiver by: transmitting the words in the source language from the at least one remote transmitter to the digital recording device;
   said human translator recording said words spoken in said source language utilizing the digital recording device, the digital recording device receiving and recording the words in the digital recording device;
   wherein said recording device further comprises means for playing back said words spoken in said source language substantially instantaneously;
   said human translator utilizing said recording device to play back said words in said source language to said human translator; and
   said human translator simultaneously interpreting and translating said words in said source language into a target language while they are being played back;
   wherein the step of simultaneously interpreting and translating comprises said human translator verbally delivering a consecutive translation in real time relative to the step of hearing the words spoken in the source language.

2. The method of claim 1 wherein said recording device comprises a digital recorder.

3. The method of claim 1 wherein said recording device has a telephone input coupled thereto and wherein said telephone input permits said recording device to receive said words spoken in said source language over a telephone line and to transmit said words translated into said target language over said telephone line.

4. The method of claim 1 wherein said recording device includes at least one earphone assembly coupled thereto and wherein said playing back of said words spoken in said source language is transmitted to said human translator through said at lease one earphone assembly.

5. The method of claim 1 wherein said recording is in communication with at least one microphone located in a position that is remote from said recording device.

6. The method of claim 5 wherein said at least one remote microphone is in wireless communication with said recording device.

7. The method of claim 1 wherein said recording device includes means for adjusting the speed at which said words in said source language are played back.

8. A method of consecutively delivering a translation in real time via simultaneously interpreting and translating recorded messages by a human translator in a courtroom, the method comprising:
   a human translator utilizing a digital recording device having wireless transmission, the human translator recording a first spoken message in the recording device;
   the human translator instantaneously playing back the first spoken message by depressing a playback activator on the digital recording device;

the human translator interpreting and translating the first spoken message while playing back the recorded first spoken message;

the human translator transmitting the translated first spoken message from a transmitter in the digital recording device to at least two remote receivers while the first spoken message is being translated;

the human translator recording a second spoken message substantially without interruption between transmitting the translated first spoken message and recording the second spoken message by depressing a second record activator;

the human translator instantaneously playing back the second spoken message;

the human translator interpreting and translating the second spoken message while playing back the recorded second spoken message; and the human translator transmitting the translated second spoken message from the transmitter in the digital recording device to at least two remote receivers while the second spoken message is being translated;

wherein the steps of interpreting and translating comprise the human translator simultaneously interpreting and translating from one language to another distinct language during the steps of instantaneously playing back, and delivering the translations consecutively in real time.

9. A method of consecutively delivering a translation by simultaneously interpreting and translating by a human translator with the aid of a recording and transmitting system in a courtroom, the method comprising:

utilizing at least one digital recording device having a wireless receiver, at least one recording activator and at least one playback activator; and utilizing a plurality of transmitters operatively connected to the recording device for transmitting a spoken message to the wireless receiver of the recording device;

a human translator utilizing the digital recording device by recording the spoken message by selectively activating the recording activator;

the human translator interpreting and translating the spoken message from a source language to a target language different from the source language while the recorded spoken message is being instantaneously played back; and the human translator verbally delivering a resulting consecutive translation relative to the step of recording the spoken message.

10. The method of claim 9, further comprising utilizing a plurality of recording activators and utilizing a plurality of playback activators, wherein the recording activator is a first recording activator and the playback activator is a first playback activator, the recording device further comprising said plurality of recording activators including the first recording activator and said plurality of playback activators including the first playback activator.

11. The method of claim 9, wherein the step of utilizing a plurality of transmitters further comprises utilizing a plurality of transceivers, wherein the recording and transmitting system further comprises said plurality of transceivers including said transmitters for transmitting spoken messages to the recording device and receiving spoken messages from the recording device.

\* \* \* \* \*